May 30, 1939.  E. G. HILL  2,160,331
AUTOMATIC GEAR SHIFTING MECHANISM
Original Filed June 28, 1934  3 Sheets—Sheet 1
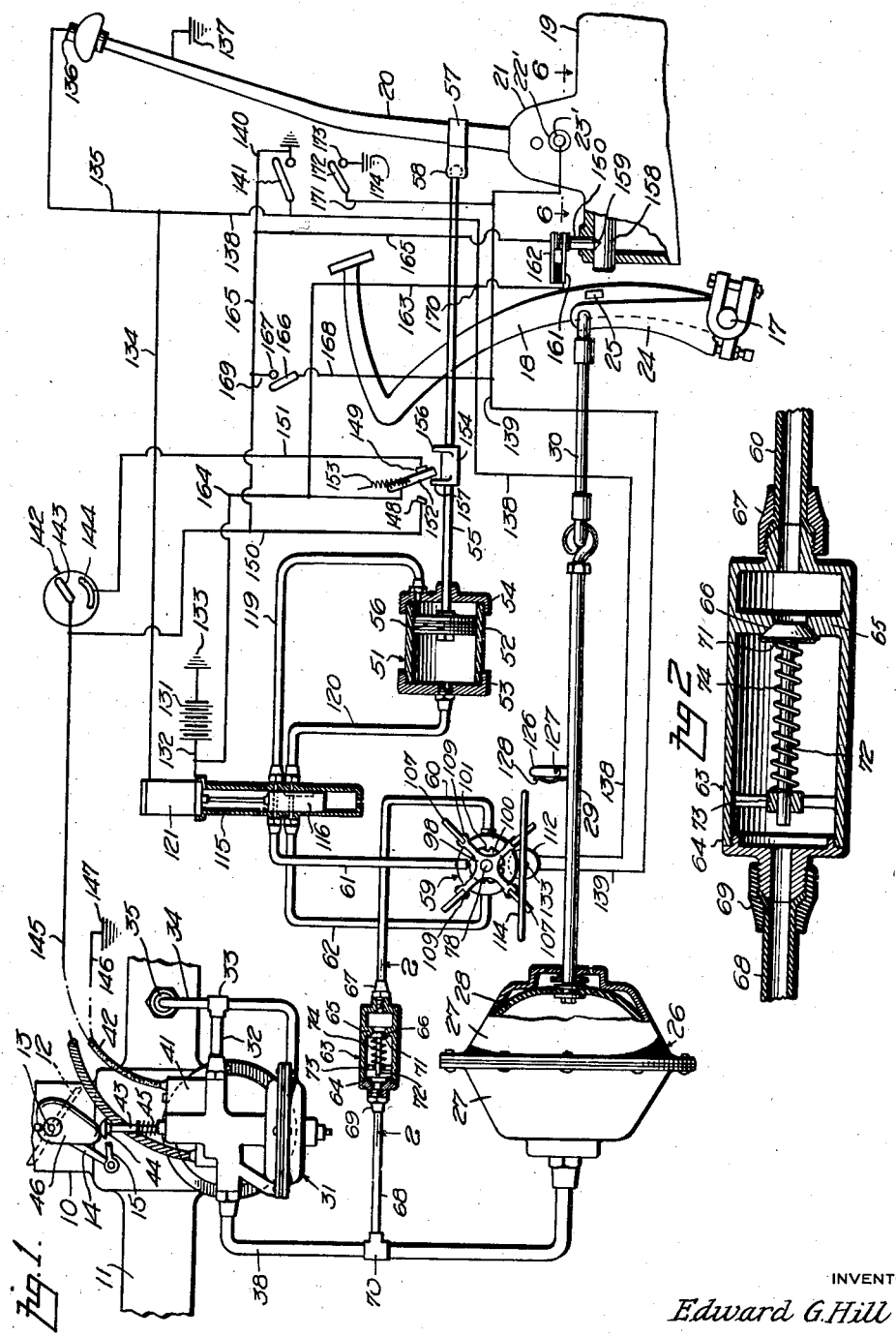
INVENTOR
Edward G. Hill
BY
ATTORNEY May 30, 1939.　　　　E. G. HILL　　　　2,160,331
AUTOMATIC GEAR SHIFTING MECHANISM
Original Filed June 28, 1934　　3 Sheets-Sheet 2
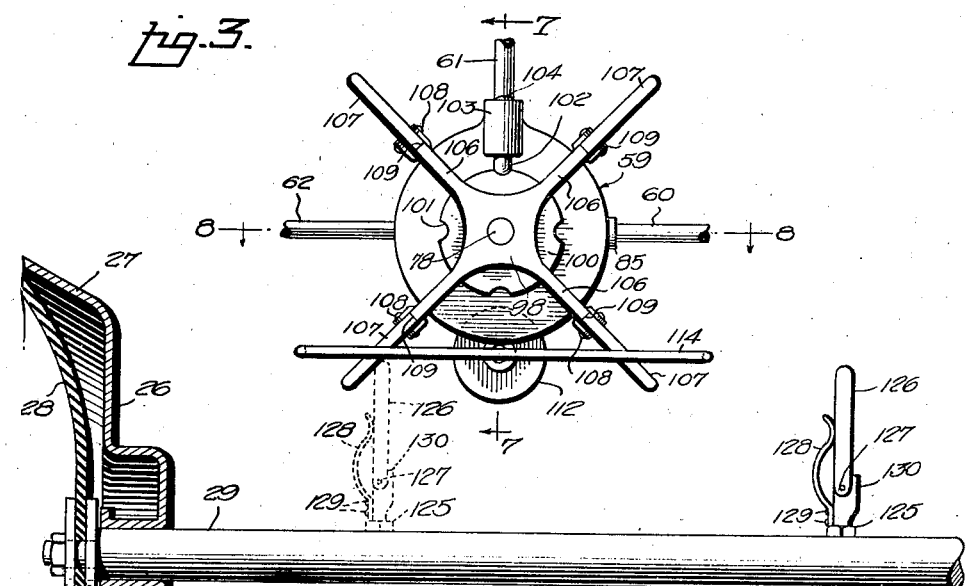
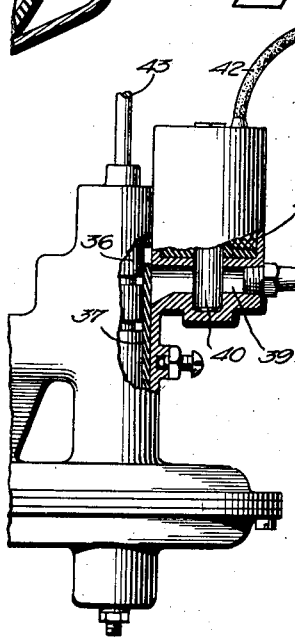
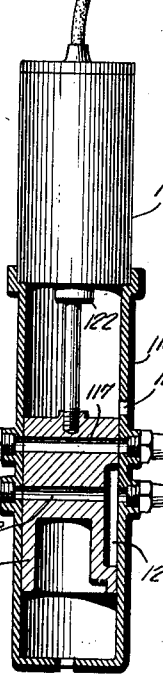
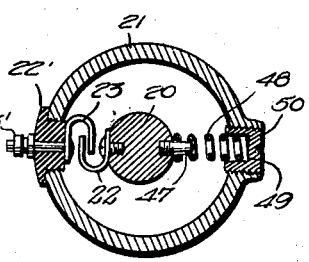
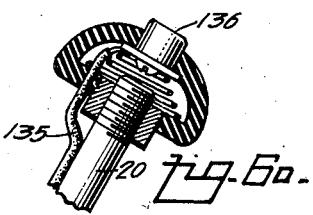
INVENTOR
Edward G. Hill
BY
ATTORNEY May 30, 1939  E. G. HILL  2,160,331
AUTOMATIC GEAR SHIFTING MECHANISM
Original Filed June 28, 1934  3 Sheets—Sheet 3
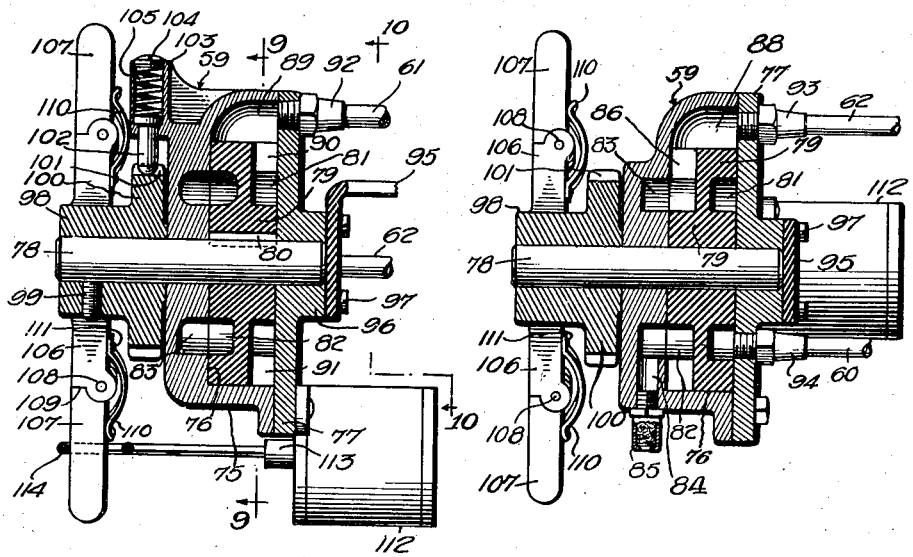
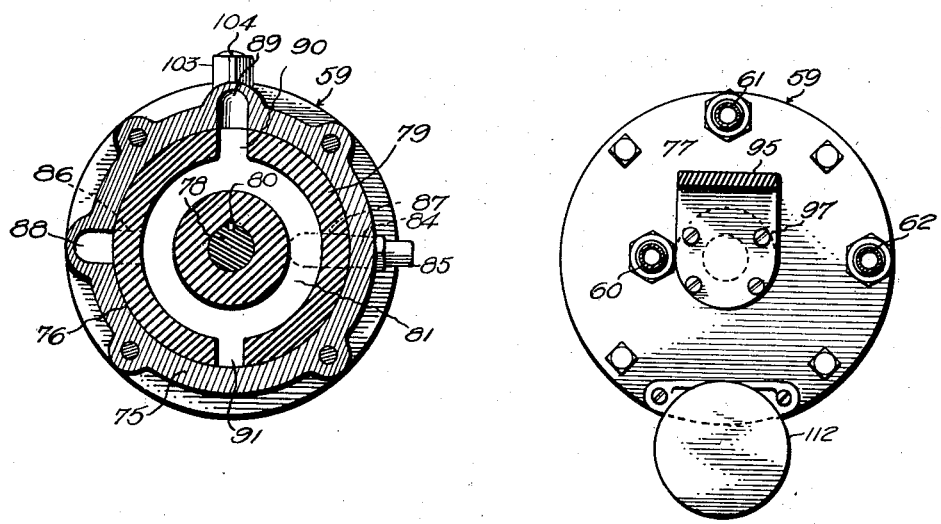
INVENTOR
Edward G. Hill
BY
ATTORNEY Patented May 30, 1939

2,160,331

UNITED STATES PATENT OFFICE 2,160,331

AUTOMATIC GEAR SHIFTING MECHANISM

Edward G. Hill, Richmond, Va., assignor to Hill Engineering Corporation, Richmond, Va., a corporation of Virginia Original application June 28, 1934, Serial No. 732,946. Divided and this application July 9, 1936, Serial No. 89,824

13 Claims. (Cl. 192—3.5)

This invention relates to gear shifting mechanisms for motor vehicles and is a division of the copending application of Edward G. Hill and John X. Phillips, Serial No. 732,946, filed June 28, 1934.

A number of devices have been developed for the purpose of shifting the gears of a motor vehicle without the necessity of the driver having to move the gear shift lever, such devices usually being operated by fluid pressure means. The majority of such devices, however, are open to the objection that they require manual actuation of suitable control means for effecting each gear shifting operation.

An important object of the present invention is to provide means for automatically shifting the gears of a motor vehicle without the use of any control means which must be actuated by the operator of the vehicle whereby gear shifting is accomplished merely through the releasing of the accelerator pedal.

A further object is to provide automatic gear shifting apparatus which changes the gear set between high and intermediate gear upon the releasing of the accelerator pedal, thus rendering it unnecessary for the operator to manually move the gear shift lever.

A further object is to provide fluid pressure operated gear shift means together with control valve mechanism for such means operative upon each releasing of the accelerator pedal, under certain conditions, for shifting the gear set between high and intermediate gears.

A further object is to provide a power device connected to the vehicle clutch and controlled by the accelerator for releasing the clutch at each releasing of the accelerator pedal, and to provide means operative upon each actuation of the power device for shifting the vehicle gears.

A further object is to provide a fluid pressure cylinder having a piston therein connected to the vehicle gear shift lever and having control valve mechanism for alternately connecting opposite ends of the cylinder to a source of differential pressure, and to provide means operative upon the releasing of the accelerator pedal for releasing the clutch and for operating the valve mechanism to effect the shifting of the gears.

A further object is to provide automatic control means for a gear shifting device of the character referred to wherein automatic shifting from intermediate to high gear takes place upon the releasing of the accelerator pedal regardless of the speed of the motor or vehicle and wherein automatic shifting from high to second gear is prevented from taking place upon the releasing of the accelerator pedal except when the vehicle speed drops to a predetermined point, whereby the engine may be employed as a brake by releasing the accelerator pedal during normal high gear driving.

A further object is to provide novel means for rendering the automatic gear shifting means inoperative and for maintaining it in inoperative condition to permit the manual movement of the gear shift lever to low and reverse gears when the apparatus is employed in connection with conventional gear shifting mechanisms.

A further object is to provide a gear shifting mechanism having power means for shifting the gears, together with means for rendering such power means inoperative so as to permit the manual shifting of the gearing.

Other objects and advantages of the invention will become apparent during the course of the following description.

In the drawings I have shown one embodiment of the invention. In this showing:

Figure 1 is a structural diagrammatic representation of the entire mechanism shown associated with portions of the motor vehicle, Figure 2 is a section on line 2—2 of Figure 1, Figure 3 is an enlarged fragmentary side elevation of the gear shift control valve and associated parts, Figure 4 is a fragmentary side elevation of a clutch control valve mechanism, parts being broken away, Figure 5 is a central vertical sectional view through a valve mechanism for rendering the gear shifting means inoperative, parts being shown in elevation, Figure 6 is a detail sectional view taken substantially on line 6—6 of Figure 1, Figure 6a is a fragmentary sectional view showing a suitable form of gear shift lever switch, parts being shown in elevation, Figure 7 is a central vertical sectional view through the gear shift control valve mechanism taken on line 7—7 of Figure 3, Figure 8 is a central sectional view through the control valve mechanism taken on line 8—8 of Figure 3, Figure 9 is a section on line 9—9 of Figure 7, and, Figure 10 is a similar view on line 10—10 of Figure 7.

Referring to Figure 1, the numeral 10 indicates the vertical conduit of the intake manifold 11 of a motor vehicle engine (not shown) and a throttle valve 12 is mounted in the conduit 10 and secured to a throttle shaft 13. The throttle shaft is operated by an arm 14 connected to an accelerator rod 15 operated by the usual accelerator pedal (not shown).

The vehicle further includes a conventional clutch (not shown) having an operating shaft 17 on which is freely mounted a conventional clutch pedal 18. The engine transmits power through the usual transmission indicated as a whole by the numeral 19 and the gears of the transmission are controlled by the usual gear shift lever 20. The gear shift lever is universally supported in a vertical extension 21 forming a part of the transmission housing. Spring contacts 22 and 23 are carried respectively by the gear shift lever 20 and by an insulating block 22' secured to the extension 21 of the gear set housing. A binding post 23' is connected to the contact 23. The contacts 22 and 23 are below the universal supporting means for the gear shift lever and accordingly are open when the gear shift lever is at the intermediate and high gear side, at which time the lower end of the gear shift lever will be moved to the left as viewed in Figure 6. The contacts 22 and 23 are in engagement when the gear shift lever is arranged at the low and reverse gear side, for a purpose to be described.

The clutch shaft 17 is provided with an arm 24 rigidly connected thereto. A lug 25 is formed integral with the pedal 18 and is engageable with the arm 24 to disengage the clutch when the pedal 18 is depressed by the foot of the operator. In accordance with the present invention, the clutch is adapted to be disengaged automatically and for this purpose a power device 26 is provided. This device may be of any desired type and in the present instance is illustrated as comprising a pair of casing sections 27 having a diaphragm 28 clamped between the edge portions thereof and operable by differential pressure. A rod 29 is connected at one end to the diaphragm 28 and a cable or any other suitable means 30 connects the free end of the rod 29 to the upper end of the arm 24.

Suitable control valve mechanism is employed for controlling the operation of the power device 26. Such a control valve mechanism has been designated as a whole by the numeral 31 and is preferably of the type disclosed in my prior Patent No. 1,964,693, granted June 26, 1934. It will become apparent that the automatic gear shifting mechanism to be described is not dependent upon the use of any particular form of control valve mechanism for the power device 26, but it is preferred that the valve mechanism of the type referred to be employed because of its smoothness and accuracy of operation. With such a device the source of power employed is the vacuum present in the intake manifold, and the valve is provided with a vacuum pipe 32 connected through a T 33 to a pipe 34, and this pipe is connected to the intake manifold as at 35.

Since the specific type of control valve 31 is not important, such mechanism has not been illustrated in detail except so far as necessary to an understanding of the present invention. Referring to Figure 4, the numerals 36 and 37 designate main control valve which control communication between the power device and the intake manifold, these valves being operative for controlling communication between the pipe 32 and a pipe 38 leading from the valve mechanism to the power device, as shown in Figure 1. The pipe 32 is connected to a passage 39 leading to the interior of the valve mechanism 31, and this passage is adapted to be controlled by a valve 40. A solenoid 41 is adapted to be energized to open the valve 40 and to be deenergized to permit it to drop to closed position. The wires for controlling the solenoid 41 are arranged in a suitable cable 42.

Movement is transmitted to the valve 37 by a stem 43 carrying a head 44 at its upper end, as shown in Figure 1. A spring 45 urges the stem 43 upwardly to maintain the head 44 in engagement with a cam 46 carried by the throttle shaft 13. The operation of this cam is fully disclosed in my Patent No. 1,964,693, referred to above. It will be apparent that when the throttle is closed as shown in Figure 1 the stem 43 and valve 37 are depressed to open communication between the power device 26 and the intake manifold, and when the throttle valve is substantially open, the stem 43 is released for upward movement to disconnect the power device 26 from the intake manifold.

The four positions of the gear shift lever of a conventional transmission are well known, the gear shift lever being arranged toward the right for second and high gears and toward the left for low and reverse gears. In the normal operation of the present invention, the gear shift lever is moved automatically back and forth between second and high gear positions, and accordingly the gear shift lever is normally biased toward the right so that the shifting means need operate only to move the gear shift lever forwardly and rearwardly to shift between second and high gears. Referring to Figure 6, the numeral 47 designates a stud carried by the gear shift lever 20 beneath its point of universal mounting within the vertical extension 21 of the transmission housing. A light coil spring 48 has one end arranged over the stud 47 and the other end of this spring is arranged in a recess 49 formed in a screw plug 50 threaded in the side of the extension 21. Accordingly it will be apparent that the spring 48 tends to urge the lower end of the gear shift lever 20 toward the left, and thus urges the upper end of the gear shift lever toward the right, that is, toward the intermediate and high gear side. As stated, the spring 48 is of slight tension and does not interfere with the manual movement of the gear shift lever to low and reverse gear positions.

Referring to Figure 1, the numeral 51 designates a power device operative for shifting the lever 20. As shown, this power device comprises a cylinder 52 having heads 53 and 54, and a piston rod 55 is slidable through the head 54. A piston 56 is connected to the piston rod 55 and is reciprocable in the cylinder 52. While the power device 51 has been illustrated as being of the cylinder and piston type, it will be apparent that any suitable power device may be employed. A yoke 57 is secured to the gear shift lever preferably close to the floor boards of the vehicle body and the rear end of the piston rod 55 is connected to the yoke 57 as at 58. This connection is preferably of the type of a ball and socket joint although the piston rod 55 possesses sufficient resiliency to take care of alterations in the position of the yoke 57 with respect to the axis of the cylinder 51 when the gear shift lever is moved to different positions.

A control valve mechanism illustrated as a whole by the numeral 59 is adapted to control the operation of the power device 51. The valve mechanism 59 is provided with a vacuum connection 60, and vacuum lines 61 and 62 communicate with opposite ends of the cylinder 52 in a manner to be described. The vacuum connection 60 may lead to a check valve indicated as a whole by the numeral 63 and illustrated in detail in Figure 2. The check valve comprises a hollow body 64 divided at one end by a partition 65 having a valve seat 66 formed therein. The pipe 60 communicates with one end of the valve body 64 and is connected thereto by a suitable union 67. A pipe 68 is connected to the other end of the valve body 64 by a union 69, and the other end of the pipe 68 is connected to the pipe 38 by a T 70.

A poppet valve 71 is engageable with the valve seat 66, as shown in Figure 2. This valve is carried by a stem 72 slidable in a guide 73 formed within the valve body 64. A spring 74 urges the valve 71 to closed position. Upon the creation of a partial vacuum in the pipe 68, the valve 71 will be unseated to connect the vacuum to the valve mechanism 59, and upon an increase in pressure in the pipe 68, the valve 71 closes. As will become apparent, the purpose of the check valve device just described is to insure disengagement of the clutch prior to the shifting of the gears, as will become apparent.

The valve mechanism mechanism 59 includes a body 75 having a cylindrical valve recess 76 therein, and the valve body is closed by a cover plate 77. A valve shaft 78 is journaled in the valve body and valve cover as shown in Figures 7 and 8. A valve 79 is rotatable in the recess 76 and is keyed to the valve shaft as at 80. The valve 79 is provided in opposite faces with annular ports 81 and 82 respectively. The port 82 communicates with an annular port 83 formed in the valve body and the port 83 communicates with the atmosphere through a radial port 84, as shown in Figure 8. A strainer 85 of any suitable type may be connected to the port 84 to prevent the entrance of foreign material into the valve body 59. At diametrically opposite points, the edge portion of the valve 79 is provided with radial ports 86 and 87 communicating with the annular port 82 for a purpose to be described.

The valve body 59 is provided with a pair of transverse ports 88 and 89. These ports are identical with each other and are preferably arranged ninety degrees apart as shown in Figure 9. Each of the ports 88 and 89 communicates with the valve recess 76 and extends across the outer face of the valve. Radial parts 90 and 91 are formed in the valve 79 at diametrically opposite points, and communicate at their inner ends with the annular port 81. The pipe 61 communicates with the port 89 of the valve body and is secured to the cover plate 77 by a union 92. The pipe 62 is connected to the cover plate 77 by a union 93 and communicates with the port 88 formed in the valve body. The vacuum connection 60 also is connected to the cover plate 77 by a union 94 and communicates with the annular passage 81 as shown in Figure 8.

The valve mechanism just described is operative automatically upon each actuation of the clutch operating power device 26, and accordingly the valve mechanism 59 is supported in proximity to the clutch operating rod 29. A suitable bracket 95 is secured to a hub portion 96, formed integral with the cover plate 77, by screws 97, and the bracket 95 may be secured to any desired stationary portion of the vehicle. At the opposite side of the mechanism, a hub 98 is secured to the shaft 78 by a set screw 99. An annular flange 100 is formed integral with the hub 98 and is provided with four notches 101 in its periphery, arranged ninety degrees apart, as shown in Figure 3. A detent 102 is engageable in the successive notches 101 to hold the shaft 78 and valve 79 in successive positions, as will become apparent. The upper end of the detent 102 projects into a small cylinder 103 formed integral with the valve housing 75. A screw plug 104 is threaded in the upper end of the cylinder 103 and a compression spring 105 is arranged in the cylinder 103 and operates between the plug 104 and the upper end of the detent 102 to urge the latter downwardly.

The hub 98 is provided with four integral radial spokes 106 and to each of these spokes a finger 107 is pivotally connected as at 108. Coacting shoulders 109 limit the swinging movement of the fingers 107 outwardly from the valve casing 75. A leaf spring 110 is connected to each spoke 106 as at 111 and tends to urge the corresponding finger 104 outwardly.

A solenoid 112 is secured against the bottom of the valve housing 75 and is provided with an armature 113. This armature is rigidly connected to a substantially rectangular frame 114 and the fingers 107 are adapted to revolve within the frame 114 out of contact therewith except when the automatic gear shifting device is locked out of operation or when the gear shift lever is arranged at the low and reverse gear side. Under the latter conditions, the solenoid 112 will be energized and the frame 114 will operate to swing the fingers 107 inwardly toward the valve housing 75 to render the valve mechanism 59 inoperative in a manner to be described.

The vacuum pipes 61 and 62 lead to a valve housing 115, shown in detail in Figure 5 of the drawings. This valve housing is preferably cylindrical and a valve 116 is reciprocable therein. Ports 117 and 118 extend through the valve 116 and communicate respectively with the pipes 61 and 62 when the valve 116 is in the normal position shown in Figure 5. A pipe 119 communicates at one end with the rear end of the cylinder 52, and at its other end this pipe 119 is connected to the valve casing 115 in normal communication with the port 117. A similar pipe 120 is connected at one end to the forward end of the cylinder 52, and at its other end, to the valve casing 115, in communication with the port 118.

A solenoid 121 is mounted at the upper end of the valve housing 115 and has an armature 122 connected at its lower end to the valve 116. One side of the valve 116 is provided with a longitudinal port 123 and when the solenoid 121 is energized, the valve 116 is moved upwardly whereby the port 123 communicates with both of the pipes 119 and 120 and with an atmospheric port 124 extending through the valve casing 115. When the valve 116 is arranged in such upper or inoperative position, the solid lower end of this valve opposite the port 123 closes the ports leading to the pipes 61 and 62. Under such conditions, it will be apparent that both ends of the cylinder 52 will communicate with the atmosphere through pipes 119 and 120 and ports 123 and 124, whereby the gear shift lever 20 may be operated manually.

As previously stated, each actuation of the power device 26 is adapted to operate the gear shifting valve mechanism 59. Referring to Figure 3, the numeral 125 designates a stud carried by the rod 29 and pivotally supporting an upstanding finger 126, as at 127. A leaf spring 128 is secured at one end to the stud 125 as at 129, and the other end of the spring engages the finger 126 to tend to swing it about its pivot in a clockwise direction as viewed in Figure 3. A stop member 130, carried by the stud 125, limits the turning movement of the finger 126. It will be apparent that the finger 126 is free to swing downwardly toward the left as viewed in Figure 3, but is fixed against turning movement toward the right. Movement of the rod 29 upon actuation of the power device 26 causes the finger 126 to engage one of the fingers 107 to rotate the valve shaft 78 through ninety degrees, and when the power device 26 is released for clutch re-engagement, the finger 126 swings downwardly to escape over the next finger 107.

An electrical system for use in connection with the apparatus is disclosed in Figure 1. The numeral 131 designates the battery of the vehicle or other source of current, and this battery has one terminal connected to one terminal of the solenoid 121 by the wire 132. The other terminal of the battery is grounded as at 133. The other terminal of the solenoid is connected to one end of a wire 134 and this wire forms a part of several parallel circuits operative for energizing the solenoid 121 for different purposes. A wire 135 is connected between the wire 134 and a button 136 mounted in the gear shift lever knob as shown in Figures 6a. This button may be depressed to electrically engage the gear shift lever, and such lever is indicated as being grounded at 137. This circuit forms one of the parallel circuits referred to and depression of the button 136 energizes the solenoid 121 to lift the valve 116, thereby connecting both ends of the cylinder 52 to the atmosphere whereupon the operator may manually move the gear shift lever to either low or reverse positions.

One end of the wire 138 is connected to the wire 134 and leads to one terminal of the solenoid 112. The other terminal of this solenoid is connected by a wire 139 to the binding post 23' carried by the gear set casing. When the contacts 22 and 23 are in engagement with each other, the circuit through the solenoid 112 is completed through the ground 137 whereupon the solenoid 112 causes the frame 114 to retract the fingers 107. This operation removes the fingers 107 from the path of travel of the finger 126 to prevent actuation of the clutch operating device from operating the valve mechanism 59. To permit complete manual operation of the gear shift lever 20, the circuit through the solenoid 121 and wires 134 and 138 may be grounded as at 140 by a manually operable switch 141.

The vehicle is provided with the usual speedometer indicated as a whole by the numeral 142 and a brush 143 is movable in conjunction with the indicating finger (not shown) of the speedometer. This brush is engageable with a contact 144 when the vehicle is traveling between zero speed and a predetermined vehicle speed, for example, 8 miles per hour. The cable 42 associated with the solenoid 41, houses two wires 145 and 146, the latter of which is grounded as at 147. The wire 145 leads to the brush 143, as shown.

A pair of contacts 148 and 149 is arranged adjacent the rod or shaft 55, as shown in Figure 1. The contact 148 is connected by a wire 150 to the wire 145 while a wire 151 connects the contact 149 to the speedometer contact 144. A snap-over switch arm 152 is movable alternately into engagement with the contacts 148 and 149 and a spring 153 moves past the pivot point of the switch 152 at each actuation thereof to hold the switch in either of its two positions. A collar 154 is carried by the shaft 55 and is provided with fingers 156 and 157 engageable with the switch arm 152 to move it between its two positions. The low and reverse gear shift rod of the gear set is indicated by the numeral 158 and this rod is notched as at 159. This notch normally receives the lower end of a vertically sliding pin 160. A pair of switch contacts 161 and 162 is arranged above the pin 160 and these switches are suitably insulated from each other. Whenever the vehicle is placed in low or reverse gear, the pin 160 will be moved upwardly out of the notch 159 and moves the free end of the switch contact 161 into engagement with the switch contact 162. The switch contact 161 is connected by a wire 163 to a wire 164 and the latter wire extends between the wire 132 and the snap-over switch 152. It will be apparent that the wire 163 can be directly connected to the same terminal of the battery as the wire 132, or it may be connected to the switch 152. The switch contacts 161 and 162, however, are not dependent for their functioning on the switch 152, as will become apparent. A wire 165 is connected at one end to the switch contact 162 and at its other end to the wire 150, although it may be connected in the wire 145. In other words, the wire 165 is in series with the solenoid 41.

While not at all essential to the operation of the present invention, means may be provided to permit the vehicle under all conditions to free wheel when the accelerator is released. For this purpose a switch 166 is engageable with a contact 167, the switch being connected to the wire 139 by a wire 168 while the contact 167 is connected by a wire 169 to the wire 165.

It is desirable to provide means for energizing the solenoid 112 independently of the gear set switch with which it is connected in series and accordingly the wire 163 is connected to the wire 138 as at 170. A wire 171 leads from the wire 139 to a switch 172. This switch is normally open and is engageable with a contact 173 grounded as at 174.

The operation of the apparatus is as follows:

Practically every present day motor vehicle is adapted to start in second gear and this practice is followed generally by a large proportion of motor vehicle drivers. In normal operation, the present apparatus is adapted to shift back and forth between second and high gear positions, and these operations are accomplished automatically merely by releasing the accelerator pedal. The operation of the gear shifting device 51 is, of course, dependent upon the valve 116 being in the operative position shown in Figures 1 and 5, that is, with the solenoid 121 deenergized. In Figure 1 the gear shift lever has been illustrated as being in high gear position with the piston 56 of the gear shifting device and the snap-over switch 152 in corresponding positions.

Assuming that the vehicle is under normal headway, under such conditions, and traveling at a speed above 8 miles per hour, the brush 143 will occupy a position out of engagement with the contact 144, such as the position shown in Figure 1. The several circuits to the solenoid 41 of the valve mechanism 31 will be broken, assuming that the free wheeling switch 166 is open, and accordingly no operation of the various parts can take place. In this connection it will be noted that the circuit through contact 148 will be broken since the switch 152 will be in engagement with the contact 149, and the circuit through the latter contact will be broken at the speedometer switch 143. Since the functioning of the gear shifting power device 51 is dependent upon a partial vacuum in the pipe 38, it will be apparent that the gear shifting mechanism and the clutch operating power device 26 will be inoperative since the valve mechanism 31 cannot connect the pipe 38 to the intake manifold as long as the solenoid 41 is deenergized and the valve 40 is closed (see Figure 4).

From the foregoing it will be apparent that when the vehicle is traveling in high gear above the predetermined speed at which the speedometer switch 143 is closed, the accelerator may be released and the engine employed as a brake without affecting the clutch or gear shifting mechanisms. Assuming that the vehicle speed drops to the point at which the speedometer switch 143 will be closed, for example, at approximately 8 miles per hour, the solenoid 41 will become energized through wires 132, 164, switch 152 and contact 149, wire 151 and the speedometer switch, through wire 145 and the solenoid 41, and thence back to the source of current through wire 146 and grounds 147 and 133. This operation will not affect the clutch or gear shifting mechanism, however, unless the accelerator pedal is completely released, since after the solenoid 40 is thus opened, the actuation of the power device 26 is dependent upon the actuation of the valve stem 43 by the throttle cam 46.

When the vehicle speed drops to the predetermined point referred to and the operator then releases the accelerator pedal, the valve mechanism 31 will operate in accordance with the disclosure in my prior Patent No. 1,964,693, previously referred to, and a partial vacuum will be established in the power device 26 to disengage the clutch. Under the conditions being considered, the gear shift lever is in high gear position, under which conditions the valve mechanism 59 will be in the condition illustrated in Figures 7, 8 and 9, the annular vacuum port 81 communicating with the pipe 61 leading to the rear end of the cylinder 52. At the same time, the annular air port 82 will be in communication with the pipe 62, as shown in Figure 8, leading to the forward end of the cylinder 52. The actuation of the power device 26 pulls the rod 29 forwardly to disengage the clutch, and this movement carries the finger 126 forwardly into engagement with one of the valve operating fingers 107. When the clutch reaches fully disengaged position, the finger 126 will occupy the dotted line position shown in Figure 3 at which time the positions of the valves in the valve mechanism 59 will be reversed, the port 91 moving into registration with the port 88 while the atmospheric port 86 will move into registration with the port 89. Under such conditions, the rear end of the cylinder 52 is ready to be connected to the atmosphere and the forward end of the cylinder is ready to be connected to the source of partial vacuum.

It will be apparent that the initial rearward movement of the diaphragm 28 as clutch disengagement starts, takes place with the valve mechanism in the position first described and it is necessary to prevent actuation of the piston 56 until the clutch has been fully disengaged. This condition is taken care of by the valve mechanism 59. It will be apparent that there can be no change in the relationship of the ports of the valve mechanism 59 until the clutch has been substantially fully disengaged since it is necessary for the actuating finger 126 to move forwardly substantially to the dotted line position shown in Figure 3 before the change in the relationship of the ports of the valve mechanism 59 can take place. As the finger 126 moves rearwardly from the position shown in Figure 3 to the position where it engages the nearest finger 107, vacuum will be maintained in the rear end of the cylinder 52 to hold the gear shift lever in high gear position. Further forward movement of the finger 126 then starts to rotate the valve 79 and initial rotation of this valve disconnects the ports 86 and 90 from the ports 88 and 89. Accordingly both ends of the cylinder 52 will be disconnected from the atmosphere and from the source of vacuum until the valve 79 has been rotated through ninety degrees at which time the clutch will be fully disengaged and gear shifting is ready to take place.

To further insure against the shifting of the gears prior to the disengagement of the clutch, the check valve device 63 is provided. The valve 71 opens only upon the building up of a substantial differential pressure on opposite sides thereof, and such pressure is not reached until the clutch is substantially disengaged. During operation of the power device 26, therefore, the valve 71 remains closed until the clutch is fully disengaged, whereupon vacuum is communicated between the pipes 60 and 68.

The initial turning movement of the fingers 107 raises the detent 102 out of the notch with which it has been in engagement, and when the disk 100 has rotated through ninety degrees together with the valve 79, the detent 102 will drop into the next notch 101 to latch the valve 79 in its next position. As stated, this action occurs when the clutch has been fully disengaged, and under such conditions, the port 86 will move into registration with the port 89 while the port 91 will move into registration with the port 88, whereupon the rear end of the cylinder 52 will be connected to the atmosphere and the forward end of the cylinder will be connected to the intake manifold through pipes 120 and 62, ports 88, 91 and 81, and thence by means of pipe 60 which is connected to the conduit 38. With the clutch thus held in disengaged position, the differential pressure on opposite sides of the piston 56 moves this piston forwardly, thus moving the gear shift lever 20 into intermediate gear position. In this connection, attention is invited to the fact that the spring 48 (see Figure 6) normally biases the gear shift lever 20 toward the right, and in the absence of any manual control of the gear shift lever 20, the latter is always in position to be moved back and forth between second and high gear positions.

When the piston 56 moves forwardly to move the gear shift lever 20 to intermediate gear position, the last portion of the movement of the piston rod 55 causes the finger 156 to engage the switch arm 152 thus moving it toward the left as viewed in Figure 1 until the spring 153 passes the pivot axis of the switch arm 152, whereupon this arm snaps over into engagement with the contact 148. This action causes the establishment of a circuit through wire 150 in parallel to the wire 151 through which the solenoid 41 has been previously energized, and the partial circuit referred to shunts around the speedometer switch 143. Thus this switch is rendered ineffective for controlling the solenoid 41 and the latter remains energized as long as the vehicle is in second gear. As a result of this operation it will become apparent that any releasing of the accelerator pedal when the vehicle is in intermediate gear will effect declutching regardless of vehicle speed since the solenoid valve 40 will remain open to permit actuation of the power device to be controlled entirely by the operation of the accelerator through the control valves 36 and 37.

From the foregoing it will be apparent that with the vehicle traveling in high gear and the accelerator released, automatic declutching will be effected when the vehicle speed drops below a predetermined point, for example at 8 miles per hour, and the gear shift lever will be automatically moved to second gear position. If the operator then depresses the accelerator, regardless of whether the vehicle comes to a complete stop, the gear shift lever will be in second gear position, and the control valve mechanism will release the power device 26 to permit reengagement of the clutch. This operation takes place in accordance with the operation of the particular valve mechanism 31 employed with the apparatus, and as the clutch is released, the shaft 29 of the power device 26 will move toward the right as viewed in Figures 1 and 3. As the finger 126 moves toward the right from the dotted line position shown in Figure 3, it will contact with the lower right hand finger 107 which will swing the finger 126 downwardly against the tension of its spring 128. Accordingly it will be apparent that the finger 126 escapes over the finger 107 and then returns to normal position, after which the finger 126 continues to move toward the right until it reaches the solid line position shown in Figure 3. At this time the clutch will be fully engaged.

The continued depression of the accelerator pedal after the clutch has become fully engaged will increase vehicle speed to the desired extent, and as previously stated, the engagement of the snap-over switch 152 with the contact 148 maintains the solenoid 41 energized as long as the gear shift lever is in second gear position. Accordingly the releasing of the accelerator pedal when the vehicle is in second gear releases the clutch regardless of vehicle speed. In other words, under such conditions, the power device 26 is controlled wholly by the valves 36 and 37, and the power device 26 will be connected to the intake manifold promptly upon the releasing of the accelerator pedal.

The releasing of the accelerator thus effects declutching and the actuation of the power device 26 again reverses the position of the ports of the valve 79 since inward movement of the shaft 29 causes the finger 126 to again engage the next finger 107 to move the valve 79 through a quarter turn. The previous actuation of the power device 26 will have moved the valve 79 ninety degrees from the position shown in Figure 9, and the second actuation of this power devices moves the valve 79 another ninety degrees, the turning movement of the valve being clockwise as viewed in Figure 9. Under such conditions the port 91 previously in registration with the port 88, will be moved into registration with the port 89. The port 86 previously in engagement with the port 89 will be moved out of registration therewith, and the other atmospheric port 87 will be moved into registration with the port 88. This operation connects the rear end of the cylinder 52 to the source of vacuum, thus moving the gear shift lever 20 to high gear position. For the reasons previously described, the actuation of the gear shift lever cannot take place until the clutch has been completely disengaged.

From the foregoing it will be apparent that the present apparatus provides automatic gear shifting from second to high gear at any vehicle speed whenever the accelerator is released, and that it provides automatic shifting from high to second gear upon the releasing of the accelerator pedal only when the vehicle speed drops to a predetermined point. Thus in the normal operation of the vehicle at speeds above any desired predetermined speed, such as 8 miles per hour, the accelerator pedal may be repeatedly released without affecting the clutch or gear shifting mechanism. When the shift mechanism moves the gear shift lever to second gear position, it remains in such position regardless of whether the vehicle merely slows down or completely stops, unless the ignition switch is turned off, under which conditions the clutch, which has been previously held disengaged, will be engaged. When the engine is subsequently started, de-clutching normally would move the valve 79 through an additional ninety degrees of movement which would cause the gear shift lever to be moved to high gear position. This obviously is undesirable in starting the vehicle from a standstill. For this reason the switch 172 is provided.

It will be apparent that whenever the vehicle is brought to a stop after traveling in high gear the gear shift mechanism will remain in second gear position and upon starting the vehicle engine it merely is necessary for the operator to hold the switch 172 in closed position until the engine has been started. The closing of the switch 172 closes a circuit from the battery 131 through wires 132, 164, 163 and 138, through the solenoid 112, and thence through wires 139 and 171, switch 172 and contact 173, and back to the source through grounds 174 and 133. The energization of the solenoid 112 causes the frame 114 to move the two lower fingers 107 out of the path of travel of the finger 126 and when the clutch is disengaged upon the starting of the vehicle engine, the valve 79 will not be affected and will remain in second gear position ready for the vehicle to start. As soon as the engine has been started, the switch 172 may be released to restore the normal condition of the fingers 107.

Of course, it is desirable to provide means for permitting the operator to move the gear shift lever to low and reverse gear positions. The present apparatus is adapted to operate automatically for shifting between second and high gear positions and includes means for permitting the use of low and reverse gears by rendering the automatic shifting means inoperative. Referring to Figure 1 it will be apparent that the button switch 136 on the gear shift lever is in series with the solenoid 121. When it is desired to use the low or reverse gear of the vehicle, the operator initially presses the button 136 to energize the solenoid 121. In this connection it will be apparent that the gear shift lever is normally arranged toward the second and high gear side of the vehicle, being biased in such direction by the spring 48. The energization of the solenoid 121 moves the valve 116 upwardly to connect both ends of the cylinder 51 to the atmosphere through pipes 119 and 120, and ports 123 and 124.

While holding the button 136 depressed, the operator is free to move the gear shift lever out of second or high gear as the case may be, and then to move the gear shift lever toward the left against the tension of the spring 48, the latter spring being merely of sufficient tension to bias the gear shift lever in the manner described. The switches 22 and 23 are normally out of engagement with each other, that is, when the gear shift lever is at the second or high gear side, and as soon as the gear shift lever is moved manually to a slight extent away from the second and high gear side, the switch elements 22 and 23 will be brought into engagement with each other.

The operation referred to permits the releasing of the button 136 and provides a holding circuit for the solenoid 121. At the same time the valve mechanism 59 is rendered inoperative to prevent the clutch from controlling the shifting of the gears. When the contacts 22 and 23 are brought into engagement with each other, a circuit is completed from the source 131 through the solenoid 121, wires 134 and 138, solenoid 112 and wire 139, and thence across contacts 22 and 23, the former being grounded on the gear shift lever 20 to complete the circuit to the source. Thus, as long as the gear shift lever is arranged toward the left, whether in neutral, low or reverse gear position, a circuit will be maintained in the manner described to hold the valve 116 in inoperative position to prevent the cylinder 52 from being connected to the source of vacuum so that the gear shift lever will remain in either low or reverse gear position when placed in such position.

At the same time, the solenoid 112 will be energized to retract the frame 114 and thus move the lower fingers 107 out of the path of travel of the finger 126. Thus, if the ignition switch is not turned off, the vehicle may be stopped with the gear shift lever in second gear position, whereupon either first or reverse gear, or both, may be utilized without changing the condition of the valve mechanism 59. Accordingly when it is desired to again start the vehicle forwardly in high gear, it merely is necessary for the operator to move the gear shift lever to neutral position and then release it. Of course, prior to moving the gear shift lever out of low or reverse gear, the accelerator will have been released thus effecting declutching in the manner described, and such declutching will not have affected the position of the valve 79 since the fingers 107 will be held out of the path of travel of the finger 126. The releasing of the gear shift lever permits it to move toward the right under the influence of the spring 48, and when the circuit is broken between the contacts 22 and 23, the fingers 107 will be released due to the deenergization of the solenoid 112. At the same time, the solenoid 121 also will be deenergized to drop the valve 116, and the valve 79 being in the proper position for such purpose, vacuum will be communicated to the forward end of the cylinder 52 to move the gear shift lever to second gear position.

In the event the gear shift lever should not be in second gear position when it is desired to start the vehicle from a standstill, the operator may close the switch 141, thus closing a circuit through solenoid 121 to render the valve 116 inoperative, whereupon the operator may move the gear shift lever to neutral position and then depress and release the accelerator. The closing of the circuit 141 does not energize the solenoid 112 and the depression of the accelerator pedal brings the clutch into operative engagement while the releasing of the accelerator again actuates the power device 26 to release the clutch and move the valve 79 one step as is necessary to place the valve mechanism referred to in the proper position to move the gear shift lever to second gear position. The releasing of the switch 141 then drops the valve 116, whereupon the forward end of the cylinder 52 will be connected to the source of vacuum to move the gear shift lever into second gear position.

From the foregoing it will be apparent that de-clutching will occur whenever the accelerator pedal is released with the gear shift lever in second gear position, regardless of engine speed, and that de-clutching will occur in high gear upon the releasing of the accelerator pedal only when the vehicle speed is sufficiently low to close the circuit between the brush 143 and contact 144. The system also is operative for de-clutching under all conditions upon the releasing of the accelerator pedal when the vehicle is in low or reverse gear. Shifting of the rod 158 in either direction, when the vehicle is in low or reverse gear, moves the plunger 160 upwardly to close the circuit between contacts 161 and 162. Under such conditions current flows from the source through wires 132, 164 and 163, across contacts 161 and 162, through wires 165, 150 and 145, and thence through the solenoid 41 and wire 146, and back to the source through grounds 147 and 133. Thus the solenoid 41 remains energized to hold the valve 40 in open position as long as the gear shift lever is in lower reverse gear positions, and the clutch control power device 26 will be controlled wholly by the valves 36 and 37 which are operated by the accelerator.

The device is also operative for full free wheeling in high gear, regardless of vehicle speed without actuating the gear shifting device. This is accomplished when the vehicle is in high gear by closing the switch 166. The closing of this switch completes a circuit from the source through wires 132, 164, 163 and 138, through the solenoid 112, thence through wires 139 and 168, switch 166, wires 169, 150 and 145, and thence through the solenoid 41 and wire 146, and back to the source through grounds 147 and 133. Completion of this circuit holds the solenoid valve 40 in open position to permit de-clutching at each releasing of the accelerator pedal. At the same time, the solenoid 112 will be maintained energized to hold the fingers 107 out of the path of travel of the finger 126, and accordingly the clutch may be repeatedly disengaged by the power device 26 without affecting the valve mechanism 59, and the latter will remain in high gear position.

The gear shifting mechanism is not dependent for its use on any particular type of valve mechanism 31, but it is preferred that the form of valve mechanism disclosed in my Patent No. 1,964,693, previously referred to, be employed. Such valve mechanism possesses advantages for use in gear shifting and free wheeling and among its other characteristics, it provides a progressively releasing of the clutch plate pressure upon the progressive releasing of the accelerator pedal so as to permit rapid clutch disengagement when the accelerator is completely released. In this connection, attention is invited to Figure 3 wherein it will be apparent that the finger 126 is adapted to partake of substantial movement before engaging the adjacent finger 107, and the partial actuation of the power device 26 to progressively release the clutch plate pressure is permitted for actuating the valve mechanism 59. The portion of the movement of the finger 126 which takes place after this finger contacts with the nearest finger 107 takes place upon the complete releasing of the accelerator pedal at which time gear shifting is desired under the normal condition of operation of the device.

From the foregoing it will be apparent that the present apparatus takes care of numerous conditions of operation of the motor vehicle clutch and gear set such as automatic shifting between second and high gears, manual operation of the gear shift lever for low and reverse gears without affecting the shifting mechanism, free wheeling in high gear, etc. The primary purpose of the apparatus, however, is directed toward the provision of means for shifting between second and high gears, and under normal conditions, a vehicle may be driven in such gears a greater proportion of the time. Moreover, it will be apparent that the driver may accelerate the vehicle to any desired speed in second gear, and the gear shift lever will be moved to high gear position promptly upon the releasing of the acceleration pedal, but after the clutch has been disengaged. It also will be apparent that shifting from high to second gear will not take place in normal conditions when the accelerator is released unless the vehicle speed is dropped to a fairly low point such as 8 miles per hour, this operation being controlled by the speedometer switch 143.

Where the expression "source of pressure differential" is employed in the following claims, it is understood that this expression defines a source of pressure which is different from that of the atmosphere, either sub- or super-atmospheric pressure, whereby the connection of the two sides of a differential pressure power device respectively to such source and the atmosphere will effect actuation of the power device.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a motor vehicle including a clutch and a transmission having a shifting member movable between two positions for transmitting power at different ratios for forward vehicle movement, a power device having a movable member connected to said shifting member, control means for said power device, and means operative upon each disengagement of the vehicle clutch for causing said control means to effect the actuation of said power device to effect movement of said shifting member successively between its two positions.

2. In a motor vehicle including a clutch and a transmission having a shifting member movable between two positions for transmitting power at different ratios for forward vehicle movement, a power device having a movable member connected to said shifting member, control means for said power device, a power device operative for disengaging the vehicle clutch, and means operative upon each actuation of said last named power device for causing said control means to effect the actuation of said first named power device to effect movement of said shifting member successively between its two positions.

3. In a motor vehicle including a clutch and a transmission having a shifting member movable between two positions in one plane for transmitting power at different ratios for forward vehicle movement, a power device having a reciprocating member connected to said shifting member, control means for said power device, and means operative upon each disengagement of the clutch for causing said control means to effect the actuation of said power device to effect movement of said shifting member between its two positions.

4. In a motor vehicle including a clutch and a transmission having a shifting member movable between two positions in one plane for transmitting power at different ratios for forward vehicle movement, a power device having a reciprocating member connected to said shifting member, control means for said power device, a power device operation for disengaging the vehicle clutch, and means operative upon each actuation of said second named power device for causing said control means to effect the actuation of said first named power device to effect movement of said shifting member successively between its two positions.

5. In a motor vehicle including a clutch and a transmission having a shifting member movable between two positions for transmitting power at different ratios for forward vehicle movement, a differential pressure power device having a movable member connected to said shifting member, control valve means connected to said power device to determine the direction of movement of said movable member, and means operative upon each disengagement of the vehicle clutch for causing said control valve means to alternately connect opposite ends of said power device to a source of non-atmospheric pressure to effect movement of said shifting member alternately between its two positions.

6. In a motor vehicle including a clutch and a transmission having a shifting member movable between two positions for transmitting power at different ratios for forward vehicle movement, a differential pressure power device having a movable member connected to said shifting member, control valve means connected to said power device to determine the direction of movement of said movable member, a differential pressure power device operative for disengaging the vehicle clutch, and means operative upon each actuation of said second named power device for causing said control valve means to alternately connect opposite ends of said first named power device to a source of non-atmospheric pressure to effect movement of said shifting member alternately between its two positions.

7. In a motor vehicle including a clutch and a transmission having a shifting member movable between two positions in one plane for transmitting power at different ratios for forward vehicle movement and between two positions in a second plane for transmitting power for reverse vehicle movement and for forward vehicle movement at a relatively low speed ratio, means biasing said shifting member to said first named plane, a power device having a movable member connected to said shifting member, control means for said power device, means operative upon each disengagement of the vehicle clutch for causing said control means to effect the actuation of said power device to effect movement of said shifting member successively between its two positions in said first named plane, and manually operable means for rendering said power device inoperative, to release said shifting member for manual movement in said second named plane.

8. In a motor vehicle including a clutch and a transmission having a shifting member movable between two positions in one plane for transmitting power at different ratios for forward vehicle movement and between two positions in a second plane for transmitting power for reverse vehicle movement and for forward vehicle movement at a relatively low speed ratio, means biasing said shifting member to said first named plane, a power device having a movable member connected to said shifting member, control means for said power device, a power device operative for disengaging the vehicle clutch, means operative upon each actuation of said second named power device for causing said control means to effect the actuation of said first named power device to effect movement of said shifting member successively between its two positions in said first named plane, and means for rendering said first named power device inoperative, to release said shifting member for manual movement in said second named plane.

9. In a motor vehicle including a clutch and a transmission having a shifting member movable between two positions in one plane for transmitting power at different ratios for forward vehicle movement and between two positions in a second plane for transmitting power for reverse vehicle movement and for forward vehicle movement at a relatively low speed ratio, means biasing said shifting member to said first named plane, a differential pressure power device having a reciprocating member connected to said shifting member, control valve means for said power device, means operative upon each disengagement of the vehicle clutch for causing said control means to connect opposite ends of said power device to a source of non-atmospheric pressure to effect movement of said shifting member successively between its two positions in said first named plane, and means for rendering said power device inoperative, to release said shifting member for manual movement in said second named plane.

10. In a motor vehicle including a clutch and a transmission having a shifting member movable between two positions in one plane for transmitting power at different ratios for forward vehicle movement and between two positions in a second plane for transmitting power for reverse vehicle movement and for forward vehicle movement at a relatively low speed ratio, means biasing said shifting member to said first named plane, a differential pressure power device having a reciprocating member connected to said shifting member, control valve means for said power device, a differential pressure power device operative for disengaging the vehicle clutch, means operative upon each actuation of said second named power device for causing said control valve means to alternately connect opposite ends of said first named power device to a source of non-atmospheric pressure to effect movement of said shifting member successively between the two positions in said first named plane, and means for rendering said first named power device inoperative, to release said shifting member for manual movement in said second named plane.

11. Apparatus constructed in accordance with claim 10 wherein the means for rendering said first named power device inoperative comprises a valve movable to a position connecting both ends of said first named power device to the atmosphere.

12. In a motor vehicle including a throttle controlled motor and a transmission having a shifting member movable between two positions for transmitting power at different ratios for forward vehicle movement, a power device having a movable member connected to said shifting member, and control means for said power device operative upon the successive closing of the throttle for causing said power device to move said shifting member alternately between its two positions.

13. In a motor vehicle including a throttle controlled motor and a transmission having a shifting member movable between two positions for transmitting power at different ratios for forward vehicle movement, a differential pressure power device having a movable member connected to said shifting member, control valve means connected to said power device to determine the direction of movement of said movable member, and means operative upon the successive closing of the throttle for actuating said control valve means to alternately connect opposite ends of said power device to a source of non-atmospheric pressure to effect movement of said shifting member alternately between its two positions.

EDWARD G. HILL.